F. G. LORENZEN.
FOOD PRODUCT, CONSISTING OF GLOBULES OF STARCHY MATERIAL AND METHOD OF PREPARING THE SAME.
APPLICATION FILED MAY 19, 1916.
1,211,462.
Patented Jan. 9, 1917.
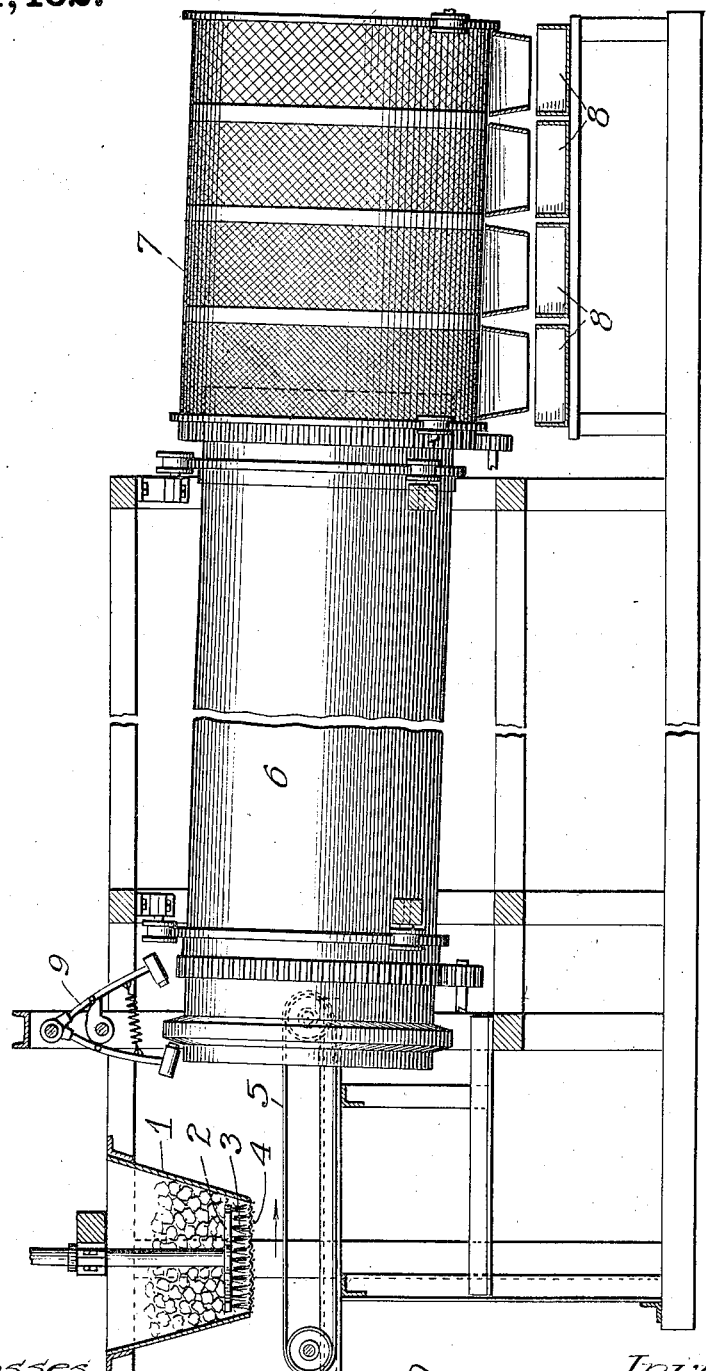

UNITED STATES PATENT OFFICE.

FREDERICK G. LORENZEN, OF BATTLE CREEK, MICHIGAN.

FOOD PRODUCT, CONSISTING OF GLOBULES OF STARCHY MATERIAL AND METHOD OF PREPARING THE SAME.

1,211,462.     Specification of Letters Patent.     Patented Jan. 9, 1917.

Application filed May 19, 1916. Serial No. 98,489.

*To all whom it may concern:*

Be it known that I, FREDERICK G. LORENZEN, a subject of the Emperor of Germany, residing at Battle Creek, in the county of Calhoun and State of Michigan, United States of America, have invented certain new and useful Improvements in Food Products, Consisting of Globules of Starchy Material and Methods of Preparing the Same, of which the following is a specification.

My invention relates to the treatment of starch by a series of mechanical and thermal steps whereby it is formed into a new food product of a wholesome and palatable character.

In my prior Patent No. 1,024,214 I have described a substitute for pearl sago and tapioca and a method of preparing the same invented by me, and my present invention may be considered as an improvement upon and development of the product and process therein described.

The object of my invention is the production of the food products hereinafter described, which shall be not only wholesome and palatable in character but attractive in appearance and delicious in flavor so as to appeal strongly to the taste of consumers, and to attain this production in the most convenient, simple and economical manner, and with certainty and uniformity.

The new products formed by carrying out the process hereinafter described may differ to some extent in appearance according to variations in the materials used and modifications in the particular steps of treatment, but are characterized by common valuable and novel qualities, as will be apparent from the description of my invention hereinafter given.

While my invention may be practised by using any suitable apparatus or machines adapted for the purpose, I have, for purposes of description and explanation only, and without intention of limiting my invention thereto, or claiming such apparatus as a part of the present invention, illustrated in the accompanying drawing one form of suitable apparatus by the use of which my invention may be carried out. In the single figure of the drawing, the apparatus is shown, somewhat diagrammatically, in side elevation.

My invention is intended to be practised with ordinary commercial forms of starch, or any starch-containing flour or finely powdered starchlike material of other descriptions having qualities and characteristics similar to starch. The raw material, of whatever specific description, must be of such character that when mixed with a certain quantity of water it will form a stiff, but not strongly sticky or adhesive cake or friable mass which may be crumbled or granulated into small flakes or particles. Ordinary corn starch will require about forty or forty-five per cent. water, but the amount must be varied according to the material used to obtain a compound of such consistency as is suitable for the granulating and tumbling operations to which the material is subjected.

In carrying out my invention with the apparatus illustrated, the material, treated with water to form a cake or mass of the consistency described, and reduced to pieces of convenient size for treatment, is fed into the hopper 1 of the granulating mill, and by the action of the radial brush-arms 2, and the brushes 3 working over the surface of the metal screen 4 which forms the bottom of the hopper, the material is flaked or granulated as it passes downwardly through the mill and through the screen. The continued stream of more or less irregular, angular fragments of various sizes, a portion of which consists of rather fine particles, is received by an endless conveyer 5 by means of which it is transported to the receiving end of a rotating tumbling drum 6 and deposited therein. In the present instance, and preferably, the forming or tumbling drum is relatively long and has a slight downward inclination toward its discharge end so that the operation may be a continuous one. The granulating and feeding operations should be conducted at such rate that the tumbling drum will only contain about twenty per cent. of its total cubic capacity of material. By the action of the drum the irregular particles are rounded and the finer particles are taken up and coalesce with the larger, so that ultimately as the material passes out of the drum, it consists of pellets of varying size, each of which consists of particles which have become aggregated together and by accretion have gathered up the finer particles and been compacted by continuous rolling into a hard, polished, perfectly round globule which runs freely upon the other globules of the mass, without any tendency to stick together. During the forming action just described, I find it highly advantageous to add at short intervals small quantities of the dry powdered material from which the moist cake is prepared. This is taken up and incorporated in the body of the globules as they are formed and serves to harden and round them and also prevents them from sticking to the surface of the drum. The drum is preferably acted upon by a jarring mechanism 9 as it rotates, the jarring being advantageous in preventing any particles of material from sticking to the drum and also promoting the accretion of the material into globules.

In some cases I add to material which has been tumbled until it is partially or completely transformed into globules, a new charge or new charges of granulated material which by accretion will be taken up by the formed pellets and incorporated with them. This procedure is especially useful in cases where it is desired to form a product comprised of globules relatively large in size. I have also found that the smallest globules formed by the tumbling operation, screened out as hereinafter described, may be fed into the tumbling drum with the freshly granulated material to serve as nuclei, and that in such case the time required to form the granular mass into completely formed globules is considerably reduced. With a drum approximately eighteen inches in diameter and revolving about twenty-eight revolutions per minute, a mass of freshly granulated material should be acted upon about one and one-half hours, more or less, according to the degree of granulation, character of moisture or dryness of the material used,—to produce perfectly formed globules, while with an admixture of about twenty-five per cent. of small previously formed globules, the time required would be reduced to approximately an hour. In size, the globules formed from material granulated into small fragments and treated as above described will ordinarily vary in size from about the size of a poppy seed to that of a pepper corn, but it will be understood that within limits the longer the tumbling operation is continued the greater the number of the smaller particles that will be taken up and become united with the larger ones.

In order to form an assortment of products of different appearance, flavors, etc., which will appeal to consumers of different tastes, and to provide a pleasing variety, I incorporate any harmless coloring matter desired, or any flavoring matter. Within limits, I preferably also add sugar or other saccharine material, as a syrup, or extract, or any material having sweetening qualities, to sweeten the product, and salt, to render it appetizing; and, as hereinafter explained, the addition of these ingredients is of value in facilitating the puffing operation and producing a better puffed product than is attainable with unflavored material.

The completely formed globules of material pass out of the discharge end of the tumbling drum into an inclined grading drum 7 which is formed with bands of screening material of different sizes of mesh, the arrangement being such that the smallest pellets will first be screened out, and then in succession larger and larger sizes separated as they pass onwardly through the drum. The globules of different sizes are collected in separate trays 8, the bottoms of which are preferably formed of open fabric. At this stage the mass of material in each tray consists of perfectly round, polished, free-running globules of uniform size.

While the apparatus illustrated is adapted to carry on the process above described of forming the material into globules in a continuous manner, it will be understood that separate charges of material may be separately granulated, then tumbled to form pellets, and finally graded in any suitable manner to separate the different sizes. In such case the tumbling cylinder may be much shorter than a cylinder designed for continuous operation.

Should any irregular or imperfect granules be formed and screened out as a result of the steps thus far described, they may be incorporated in a fresh batch of raw starch cake or dough, and all loss because of imperfect action of the tumbling drum be entirely avoided.

The trays of globular material, formed as above described, are next subjected to the action of hot steam, preferably somewhat superheated so as to be free of moisture, whereby the material assumes a gelatinized structure, that is, the starch is transformed,—in some cases partially, and in some cases completely, into a gelatinous form. If the material is intended for sale as a substitute for tapioca, for use in soups, puddings, various forms of dessert, etc., it should preferably be lightly cooked,—say twenty minutes, for instance, under a pressure of from ten to twenty pounds. If intended for the further step of puffing, however, the cooking should be prolonged for about an hour in order that the starch may be completely or entirely gelatinized, in which condition it becomes translucent and relatively tough and insoluble. As a result of the cooking operation the globules become somewhat adherent at their points of contact, although they do not coalesce, and after the mass has become cold and preferably has dried out to a slight extent, they may be readily separated by a rubbing or crushing operation. The drying is then continued at least to the point of atmospheric or normal dryness, in which condition the product will generally contain from eight to ten per cent. of moisture. The product, assuming it has been thoroughly or completely gelatinized by the cooking, may now be puffed by subjecting it to a sharp dry heat for a short time. I have discovered that a flavored product, that is, one in which a limited amount of sugar, flavoring and seasoning matters of various kinds, such as malt, salt, etc., are incorporated, will puff more readily and to a greater degree of lightness than an unflavored product. The product increases in bulk from four to six times by the puffing process, and loses its translucent appearance, becoming opaque and, if uncolored, white, or if tinted becoming considerably lighter in color, and assuming a very pleasing smooth and soft-colored appearance. The puffed product is entirely free from any hard particles, and because of this fact, and the pleasing appearance and delicious flavors which may be imparted to it, it is highly desirable as a comestible, either without further treatment, or as an ingredient in foods or confections prepared from it,—as for instance in preparing an article similar to the well-known cracker-jack. If desired, after the puffing is effected as above described, the application of heat may be continued to toast the product and produce an agreeable modification in its taste, this toasted product being adapted for the same uses as the untoasted.

It will be understood that the apparatus mentioned in the foregoing specification is not herein claimed, but is expressly reserved as the subject-matter for an application for a separate patent.

I claim:

1. As a new article of manufacture, a food product consisting of globules of starchy material composed of finely ground aggregated particles mixed with saccharine material and having a gelatinized structure.

2. As a new article of manufacture, a food product consisting of globules of starchy material composed of finely ground aggregated particles mixed with saccharine material and completely gelatinized to a state in which it is translucent and relatively tough and insoluble.

3. As a new article of manufacture, a food product consisting of globules of starchy material composed of finely ground aggregated particles mixed with flavoring and seasoning material, and having a gelatinized structure.

4. As a new article of manufacture, a food product consisting of globules of starchy material composed of finely ground aggregated particles mixed with flavoring and seasoning materials and completely gelatinized to a state in which it is translucent and relatively tough and insoluble.

5. As a new article of manufacture, a food product consisting of globules of artificially colored starchy material composed of finely ground aggregated particles mixed with saccharine material and having a gelatinized structure.

6. As a new article of manufacture, a food product consisting of globules of artificially colored starchy material composed of finely ground aggregated particles mixed with flavoring and seasoning materials and having a gelatinized structure.

7. As a new article of manufacture, a food product consisting of globules of artificially colored starchy material composed of finely ground aggregated particles mixed with saccharine material and flavoring and seasoning materials and having a gelatinized structure.

8. As a new article of manufacture, a food product consisting of globules of artificially colored starchy material composed of finely ground aggregated particles gelatinized and puffed to constitute a relatively light and porous product.

9. As a new article of manufacture, a food product consisting of globules of starchy material composed of finely ground aggregated particles mixed with flavoring and seasoning materials and gelatinized and puffed to constitute a relatively light and porous product.

10. As a new article of manufacture, a food product consisting of globules of starchy material composed of finely ground aggregated particles mixed with saccharine material and gelatinized and puffed to constitute a relatively light and porous product.

11. As a new article of manufacture, a food product consisting of globules of artificially colored starchy material composed of finely ground aggregated particles mixed with saccharine material and flavoring and seasoning materials and gelatinized and puffed to constitute a relatively light and porous product.

12. As a new article of manufacture, a food product consisting of globules of finely ground aggregated particles of starchy material gelatinized and puffed and toasted to constitute a relatively light and porous product.

13. As a new article of manufacture, a food product consisting of globules of finely ground aggregated particles of starchy material mixed with saccharine matter, and gelatinized and puffed and toasted to constitute a relatively light and porous product.

14. The process of treating ground starchy material to form a food product which consists in forming said material with water into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are puffed to form a relatively light and porous product.

15. The process of treating ground starchy material to form a food product which consists in forming said material with water into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are first puffed and then toasted to form a relatively light and porous product.

16. The process of treating ground starchy material to form a food product which consists in forming said material with water and saccharine material into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are first puffed and then toasted to form a relatively light and porous product.

17. The process of treating ground starchy material to form a food product which consists in forming said material with water and with a limited amount of saccharine material, into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are puffed to form a relatively light and porous product.

18. The process of treating ground starchy material to form a food product which consists in forming said material with water and with flavoring and seasoning materials into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are puffed to form a relatively light and porous product.

19. The process of treating ground starchy material to form a food product which consists in forming said material with water and with artificial coloring matter into a moist friable cake, then granulating the moist material, then subjecting the granulated particles to a rolling, tumbling operation until round globules are formed, then cooking said globules until they are gelatinized, then separating and drying said globules, then subjecting them to a sharp dry heat whereby they are puffed to form a relatively light and porous colored product.

20. The process of treating ground starchy material to form a food product which consists in forming said material with water into a moist friable cake, then granulating the moist material, then subjecting the granulated particles together with previously formed small globules of the same material to a rolling, tumbling operation until the whole mixture is formed into round globules, then screening said globules to separate the small sizes for further operation with fresh material in like manner.

21. The process of treating ground starchy material to form a food product which consists in forming said material with water into a moist friable cake, then granulating the moist material, then subjecting the granulated particles to a rolling tumbling operation until rounded pellets are formed, then adding fresh granulated particles and subjecting the mixture to continued rolling and tumbling until the whole is formed into round globules.

22. The process of treating ground starchy material to form a food product which consists in forming said material with water into a moist friable cake, then granulating the moist material, and then subjecting the granulated particles to a rolling, tumbling operation and meanwhile, adding dry powdered material until the mass is converted into round globules.

23. The process of treating ground starchy material to form a food product which consists in forming said material with water into a moist friable cake, then granulating the moist material, then subjecting the granulated particles to a rolling tumbling operation until rounded pellets are formed, then adding fresh granulated particles and subjecting the mixture to continued rolling and tumbling and meanwhile adding dry powdered material until the mass is converted into round globules.

24. The process of treating ground starchy material to form a food product which consists in forming said material with water into a moist friable cake, then granulating the moist material, and then subjecting the granulated particles to the rolling tumbling operation of a rotating drum and jarring said drum during such tumbling operation until the mass is converted into round globules.

FREDERICK G. LORENZEN.

Witnesses:
R. R. THOMSON,
CHAS. M. MARBLE.